United States Patent [19]

Su et al.

[11] 4,206,593
[45] Jun. 10, 1980

[54] GAS TURBINE

[75] Inventors: Cyril K. M. Su, La Celle Saint Cloud; Michel Verwaerde, Orgeval, both of France

[73] Assignee: Institut Francais du Petrole, Rueil-Malmaison, France

[21] Appl. No.: 908,604

[22] Filed: May 23, 1978

[30] Foreign Application Priority Data

May 23, 1977 [FR] France .............................. 77 16241

[51] Int. Cl.² .............................................. F02C 3/18
[52] U.S. Cl. .................................. 60/39.04; 60/39.17
[58] Field of Search ...................... 60/39.04, 39.17, 261

[56] References Cited

U.S. PATENT DOCUMENTS

| 1,988,456 | 1/1935 | Lysholm | 60/39.17 |
| 2,242,767 | 5/1941 | Traupel | 60/39.17 |
| 2,587,649 | 3/1952 | Pope | 60/39.16 R |
| 2,671,313 | 3/1954 | Laramee | 60/261 |
| 3,054,257 | 9/1962 | Schelp | 60/39.17 |
| 3,315,467 | 4/1967 | DeWitt | 60/39.17 |

FOREIGN PATENT DOCUMENTS 823541 12/1951 Fed. Rep. of Germany .......... 60/39.17

*Primary Examiner*—Louis J. Casaregola
*Attorney, Agent, or Firm*—Millen & White

[57] ABSTRACT

Gas turbine comprising an air compressor delivering compressed air to a first combustion chamber, means for feeding said first combustion chamber with fuel, means for igniting the resulting mixture of said fuel with said compressed air, a first turbine, actuated by said ignited mixture wherefrom exhaust gases are discharged to a second combustion chamber of venturi shape, provided with means for injecting additional fuel in the direction of the venturi axis and means for igniting the resulting gaseous mixture, a second turbine actuated by said last mentioned gaseous mixture and heat exchange means for recovering heat from the exhaust gases of said second turbine.

14 Claims, 5 Drawing Figures

GAS TURBINE

SUMMARY OF THE INVENTION

A conventional gas turbine essentially comprises an air compressor of the turbine type, one or more combustion chamber(s) and one or more expansion turbine(s) whereby the motive power of the combustion gases may be recovered. These three essential parts may be given various positions or orientations with respect to one another, they can be placed on the same shaft or on separate shafts, but, in every case, the gases flow in the direction from the compressor to the combustion chamber and then to the turbine.

The present invention describes a gas turbine whose thermal and mechanical yields are increased as compared to those of the conventional gas turbines, the achievable gain being as high as 15% or more on the same shaft. Said gas turbine comprises essentially, in the direction of the gas flow, at least one air compressor, at least a first combustion chamber, said chamber being preferably operated with an air excess, at least a first working turbine (expansion), at least one second combustion chamber placed in a venturi and at least one second working turbine (expansion). The compressor and the expansion turbines may be placed on the same shaft or on separate shafts. By venturi it is meant a space of progressively increasing section starting on both sides from a zone of minimum section called venturi "throat". The venturi operation may be either subsonic or supersonic.

In this venturi is placed at least one injector of gaseous or liquid fuel, preferably in the venturi throat or in the vicinity thereof, as well as ignition means, for example by spark or by a pilot flame. The combustion of the fuel in the venturi is ensured at least partly by the air excess introduced in the first combustion chamber; if necessary, additional air may be introduced in the vicinity of the fuel injector or in admixture with the fuel. The injection is preferably performed along an average direction which is that of the venturi axis.

There is introduced, for example, 25 to 65% (preferably 30 to 50%) of the total fuel amount into the one or more first chamber(s) and the complementary amount into the one or more second chamber(s). This percentage is computed as heat units.

Preferably, from 50 to 100% of the total amount of air used, is introduced into the one or more first combustion chamber(s), the optional complementary amount being introduced into the one or more second chamber(s).

The first chamber is thus preferably operated with an air excess. This excess is, for example, from 10 to 200% (preferably from 100 to 200%) with respect to the theoretical amount of air required for the combustion of the fuel introduced into the first chamber.

In practice, it is preferred to use a slight excess of air with respect to the stoichiometry, so that the exhaust gases escaping from the second turbine, still contain a small proportion of oxygen, for example 0.5 to 3% by weight, in most cases 1 to 2% by weight.

The compression rate of the air feeding the first combustion chamber may be selected within a wide range, according to the required air pressure, for example a range from 4 to 30, preferably from 4 to 8 atmospheres. As concerns the combustion temperature, it is limited in practice by the resistance of the materials used; with conventional materials, it is usual to proceed at temperatures of about 927° to 1040° C. but, with special materials, still higher temperatures may be attained. All of the exhaust gases leaving the first combustion zone are introduced into the first turbine and then into the second combustion zone.

The ignition, in the primary or secondary chamber, may be obtained in a conventional manner, for example by means of a pilot flame.

At the outlet from the second working turbine (expansion) the temperature of the gases is usually from 500° to 700° C., and these gases may be passed through exchangers or other devices for recovering energy or heat therefrom; thus, for example, it is possible to produce mechanical, thermal or electrical energy; it is also possible to heat blocks of buildings or certain units of the chemical or petroleum industry.

As concerns the second combustion zone, it is preferred that the combustion occur at least in major part, in the venturi throat and/or in the vicinal following zone of progressively enlarged section, in the direction of the gas flow. However, in order to take into account the flame inertia, it may be optionally convenient to inject the fuel at a point located at the middle of the venturi throat or even slightly upstream.

The widening angle "a" of the venturi is preferably from 10° to 30°. The narrower portion of the venturi may have the shape of a circle; it may also extend on a certain length and then have the shape of a cylinder open at both ends. The temperature is usually of the same order as that prevailing in the first combustion chamber. By way of example, the operation has been conducted with gas velocities of 70 m/s or more, but however still below the sound velocity, at the inlet of the venturi (section AA' of FIG. 2 ), and 8 to 14 times more in the venturi throat (section BB' on FIG. 2). The section AA', expressed in surface units, was about 4 to 12 times larger than section BB'.

DESCRIPTION OF THE PREFERRED EMBODIMENTS

Figure 1:
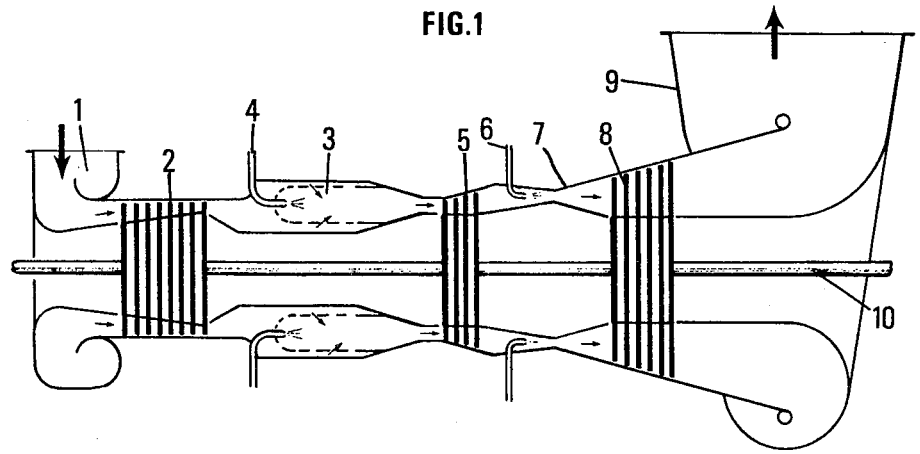
FIG. 1 illustrates a gas turbine engine including the instant invention.
Figure 2:
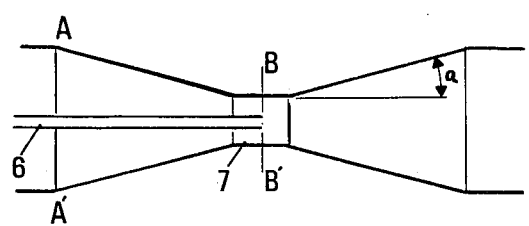
FIGS. 2 and 3 illustrate venturi configurations for use with the engine of FIG. 1.

FIG. 1 shows a turbine operated according to the principle of the invention. In FIG. 1, the air is introduced through duct 1; it passes then into the compression stage 2. The compressed air enters the combustion chamber 3; gaseous or liquid fuel is introduced through duct 4.

The mixture is ignited by means of a pilot flame or a similar device, not shown. The hot gases actuate the first turbine 5 and then pass through the venturi throat 7; additional fuel is admitted through duct 6. The gases are ignited by means of a pilot flame, not shown, and then they are used to actuate the second turbine 8; they are finally discharged through line 9. Their temperature and power are sufficient for making it possible to recover a larger portion of said heat and power, for example by passage through heat exchangers.

The compressor 2 and the turbines 5 and 8 are carried on the same shaft 10; separate shafts may however be provided.

Figure 3:
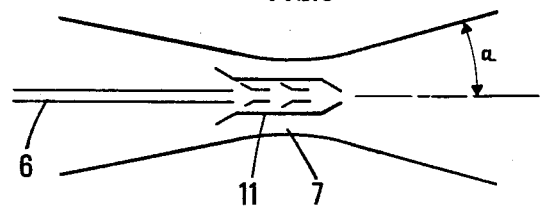

FIG. 3 shows a venturi having an elongated throat. In FIG. 3 the fuel injector 6 is extended with a burner 11 providing for a good mixture of the fuel with the hot gases before ignition. The venturi and the two cone frustums forming the combustion chamber have preferably a quite symmetrical shape with respect to the longitudinal axis.

Figure 4:
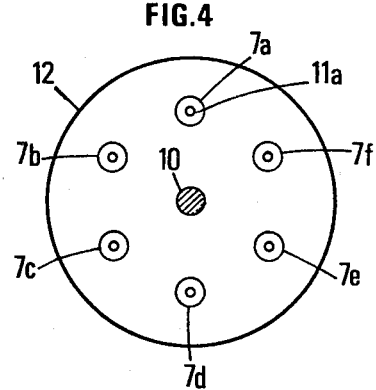
FIGS. 4 and 5 illustrate alternative multiple venturi arrangements.
Figure 5:
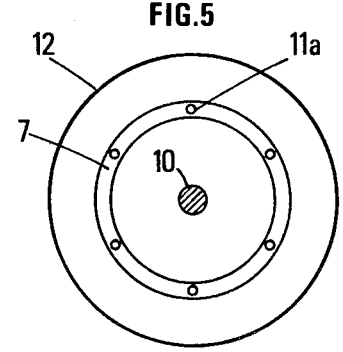

Instead of a single venturi, several venturis may be provided such as 7a, 7b, 7c, . . . 7f, concentrically around axis 10, as shown in cross-section in FIG. 4. Another arrangement (FIG. 5) consists of joining all the venturis which then take the shape of a hollow ring 7. The whole is placed into the casing 12 of the apparatus. The burners are placed inside, for example 11a.

For recovering the heat of the exhaust gases, it is preferred to make use of very compact vertical exchange surface in a kiln.

As fuel, there can be used a gas or a liquid, for example methane, naphtha, kerosene, gas oil or Diesel oil. An important advantage of the present device consists in the possibility of using heavy fuels such as gas oil and Diesel oil.

What we claim is:

1. A gas turbine comprising an air compressor, a first combustion chamber of cylindrical shape comprising a fuel inlet at the first end thereof and an exhaust gas exit at the second end thereof, the compressed air from said compressor entering said first combustion chamber, a first expansion turbine receiving combustion gases from said exhaust gas exit, at least one second combustion chamber of venturi shape comprising an internal means for injecting fuel in the direction of the longitudinal axis of the venturi, said at least one second combustion chamber of venturi shape receiving substantially all of the gases from said first expansion turbine, and a second expansion turbine, said second expansion turbine receiving combustion gases from said second combustion chamber of venturi shape.

2. A gas turbine according to claim 1, wherein the widening angle of said at least one second combustion chamber of venturi shape is from 10° to 30°.

3. A process for operating a gas turbine comprising an air compressor, a first combustion chamber of cylindrical shape comprising a fuel inlet at the first end thereof and an exhaust gas exit at the second end thereof, the compressed air from said air compressor entering said first combustion chamber, a first expansion turbine receiving combustion gases from said exhaust gas exit, at least one second combustion chamber of venturi shape comprising an internal means for injecting fuel in the direction of the longitudinal axis of the venturi, said at least one second combustion chamber of venturi shape receiving substantially all of the gases from said first expansion turbine, and a second expansion turbine, said second expansion turbine receiving combustion gases from said second combustion chamber of venturi shape, said process comprising introducing 25 to 65% of the total amount of fuel required into said first combustion chamber and further introducing 35 to 75% of said total amount of fuel required into said the at least one second combustion chamber of venturi shape.

4. A process according to claim 3, wherein 30 to 50% of said total amount of fuel required is introduced into said first combustion chamber and 50 to 70% of said total amount of fuel required is introduced into said at least one second combustion chamber of venturi shape.

5. A process according to claim 3, wherein 50 to 100% of the total amount of air required is introduced into said first combustion chamber, and wherein 50 to 0% of the total amount of air required is introduced into said at least one second combustion chamber of venturi shape.

6. A process according to claim 5, wherein said total amount of air introduced into said first combustion chamber constitutes 110 to 300% of the air stoichiometrically required to support combustion in said first combustion chamber.

7. A process according to claim 3, wherein the gas velocity in the throat of said at least one second combustion chamber of venturi shape is 8 to 14 times greater than the gas velocity at the inlet of said at least one second combustion chamber of venturi shape.

8. A process according to claim 3, wherein the fuel is gas-oil or Diesel-oil.

9. A gas turbine according to claim 1, wherein the cross-sectional area of an inlet of said at least one second combustion chamber of venturi shape is 4 to 12 times larger than the cross-sectional area of the throat of said at least one second combustion chamber of venturi shape.

10. A gas turbine according to claim 9, wherein said at least one second combustion chamber of venturi shape comprises several second combustion chambers of venturi shape, said several combustion chambers of venturi shape being concentrically spaced about the longitudinal axis of said turbine.

11. A gas turbine according to claim 10, wherein said several combustion chambers of venturi shape are operatively connected with each other, thereby forming a hollow ring concentrically spaced about said longitudinal axis of said gas turbine.

12. A process according to claim 8, wherein said air enters said first combustion chamber at a pressure of 4 to 30 atmospheres.

13. A process according to claim 12, wherein said air enters said first combustion chamber at a pressure of 4 to 8 atmospheres.

14. A process according to claim 8, wherein combustion in said at least one second combustion chamber of venturi shape takes place substantially completely in the throat portion of said venturi.

* * * * *